US 11,692,597 B2

(12) United States Patent
Robert et al.

(10) Patent No.: US 11,692,597 B2
(45) Date of Patent: Jul. 4, 2023

(54) FREE-WHEEL PROVIDED WITH VARIABLE-GEOMETRY LUBRICATION BARRIER

(71) Applicant: AIRBUS HELICOPTERS, Marignane (FR)

(72) Inventors: Sebastien Robert, Saint Cannat (FR); Adrien Escoffier, Septemes les Vallons (FR)

(73) Assignee: AIRBUS HELICOPTERS, Marignane (FR)

( * ) Notice: Subject to any disclaimer, the term of this patent is extended or adjusted under 35 U.S.C. 154(b) by 0 days.

(21) Appl. No.: 17/530,594

(22) Filed: Nov. 19, 2021

(65) Prior Publication Data

US 2022/0186791 A1 Jun. 16, 2022

(30) Foreign Application Priority Data

Dec. 10, 2020 (FR) ...................................... 2012965

(51) Int. Cl.
*F16D 41/067* (2006.01)
(52) U.S. Cl.
CPC ........ *F16D 41/067* (2013.01); *F16D 2300/06* (2013.01)
(58) Field of Classification Search
CPC ...... F16D 41/06; F16D 41/064; F16D 41/066; F16D 41/067; F16D 2300/0214; F16D 2300/06; F16D 2300/08; F16J 15/164; F16J 15/42; Y10S 277/929; B64C 27/12; F16C 33/7816–783
USPC .......................... 192/113.32, 113.35; 277/433
See application file for complete search history.

(56) References Cited

U.S. PATENT DOCUMENTS

| 3,784,268 | A | * | 1/1974 | De Gioia | ............... F16C 19/466 277/553 |
| 5,474,152 | A | * | 12/1995 | Wilkinson | ............... F02N 15/00 192/113.32 |
| 11,466,736 | B2 | * | 10/2022 | Robert | .................. F16D 41/067 |
| 2013/0199886 | A1 | | 8/2013 | Heath et al. | |

FOREIGN PATENT DOCUMENTS

JP 2020051490 A 4/2020

OTHER PUBLICATIONS

French Search Report for French Application No. FR2012965, Completed by the French Patent Office, dated Aug. 24, 2021, 8 pages.

* cited by examiner

*Primary Examiner* — Richard M Lorence
(74) *Attorney, Agent, or Firm* — Brooks Kushman P.C.

(57) ABSTRACT

A free-wheel comprising a driving part and a driven part that are able to rotate about an axis of rotation, the free-wheel comprising at least one rotational connecting member arranged in a connection space, a driven connection section of the driven part surrounding a driving connection section of the driving part, the connection space being located radially, with respect to the axis of rotation, between the driving connection section and the driven connection section. The free-wheel comprises at least one barrier, the geometry of which varies depending on the speed of rotation of the driving part, arranged radially between the driving part and the driven part and longitudinally against the connection space, the barrier being constrained to rotate with the driving connection section.

14 Claims, 2 Drawing Sheets

FREE-WHEEL PROVIDED WITH VARIABLE-GEOMETRY LUBRICATION BARRIER

CROSS REFERENCE TO RELATED APPLICATIONS

This application claims priority to French application No. FR 20 12965 filed on Dec. 10, 2020, the disclosure of which is incorporated in its entirety by reference herein.

TECHNICAL FIELD

The present disclosure relates to a free-wheel provided with a variable-geometry lubrication barrier. The disclosure therefore lies in the technical field of free-wheel lubrication.

BACKGROUND

A free-wheel is usually provided with a driving part, a driven part, and a rotational connection system for rotationally connecting the driving part and the driven part under particular conditions.

When stationary, or as long as the driven part is rotating faster than the driving part about an axis of rotation, the free-wheel is in an operating mode referred to, for convenience, as the "desynchronized" or "disengaged" operating mode. The driving part does not transmit engine torque to the driven part and vice versa. The driven part and the driving part are rotationally disengaged from each other about the axis of rotation. In this disengaged operating mode, the driven part and the driving part have a degree of freedom to rotate relative to each other about the axis of rotation.

Conversely, in an operating mode referred to as the "synchronized" or "engaged" operating mode, the driving part and the driven part rotate together at the same speed about the axis of rotation.

In order to switch from one operating mode to another, the free-wheel is provided with at least one connecting member interposed between the driving part and the driven part. The connecting member rotationally connects the driving part and the driven part in the engaged operating mode. In this engaged operating mode, the connecting member allows the abovementioned degree of rotational freedom between the driving part and the driven part to be eliminated.

According to one example, a free-wheel comprises a connecting member provided with at least one pawl.

According to one example, a roller free-wheel may comprise a first shaft having a peripheral portion provided with ramps. Conversely, a second shaft has a cylindrical face facing the ramps radially. Consequently, roller connecting members are carried by a cage and are arranged in the space radially separating the ramps and the cylindrical face. To either side of the rollers, the free-wheel may comprise two bearings, each bearing being interposed radially between the first shaft and the second shaft. During the disengaged operating mode, the rollers are each arranged at the foot of a ramp and do not connect the first shaft and the second shaft in rotation. When the switch is made to the synchronized operating mode, the rollers are moved towards the top of the ramps and temporarily wedged between the ramps and the cylindrical face. The first shaft and the second shaft become constrained to move together in rotation.

The first shaft may represent the driving part while the second shaft represents the driven part. The reverse is also possible.

Moreover, the first shaft may be an outer shaft that surrounds an inner shaft represented by the second shaft, or the second shaft may be an outer shaft that surrounds an inner shaft represented by the first shaft.

In a power plant of a rotorcraft, the driving part of a free-wheel may be connected to an engine, while the driven part of the free-wheel may be connected to a rotor. The free-wheel may be arranged within the engine, or within a gearbox or even within a kinematic linkage connecting an engine to the gearbox. For example, the gearbox may include one mechanical input system for transmitting torque for each engine, each mechanical input system for transmitting torque including a free-wheel. Each free-wheel can desynchronize an engine and the rotor, for example during starting or in the event of an engine failure.

Irrespective of its arrangement and nature, a free-wheel can be lubricated to optimize its service life. During the engaged operating mode, the free-wheel may need to be lubricated at the contact zones. These contact zones may in particular comprise, in a roller free-wheel, the rollers, the ramps, the cylindrical face and, if applicable, bearing members. During the disengaged operating mode, the free-wheel may heat up, for example due to the high-speed movement of any rollers. The lubrication system then aims to remove calories in order to cool the free-wheel.

According to a first known embodiment, the free-wheel is greased.

According to a second embodiment, the contact zones, in particular the rollers in the context of a roller free-wheel, are immersed in an oil bath. Immersing the connecting members of the free-wheel in oil is effective in limiting wear to this free-wheel during the engaged operating mode. Conversely, during the disengaged operating mode, the oil itself may be a source of heating due to a splashing effect.

A third known embodiment consists in spraying the contact zones with oil. For example, a jet conveys oil into the inner shaft. This inner shaft comprises at least one radial port for directing the oil between the driving part and the driven part by centrifugal effect, and therefore towards the contact zones of the free-wheel. The oil is then discharged out of the free-wheel by overflowing, passing through the two bearings arranged longitudinally to either side of the rollers, for example.

This third embodiment therefore allows a small quantity of lubricant to be circulated during the disengaged operating mode in order to remove calories from the free-wheel. However, the third embodiment does not allow the contact zones to be immersed during the engaged operating mode.

To remedy this, the free-wheel may include at least one flange for defining a space that forms a "pool" of lubricant containing the rollers. The flange does not completely close a passage in fluid communication with the connection space. For example, a flange may be produced with a shouldered spacer or with a deflector integrated into one of said bearings. During the engaged operating mode, oil accumulates in this space before overflowing out of it over the flange. Determining the dimensions of the flange is a complex matter, as it requires the contact zones to be sufficiently immersed in oil during the engaged operating mode, while on the other hand preventing a splashing effect from occurring during the disengaged operating mode.

Document US 2013/199886 A1 describes a system provided with a housing. The housing accommodates two hubs and two roller assemblies. The system also includes a friction mechanism.

Document JP 2020 051490 A describes a free-wheel system provided with a lubrication device that has at least one seal.

SUMMARY

An object of the present disclosure is therefore to propose an alternative free-wheel that aims to be advantageous both during the engaged operating mode and during the disengaged operating mode.

The disclosure therefore relates to a free-wheel comprising a driving part and a driven part that are able to rotate about an axis of rotation, said free-wheel comprising at least one rotational connecting member arranged in a connection space, a driven connection section of the driven part surrounding a driving connection section of the driving part, said connection space being located radially, with respect to the axis of rotation, between said driving connection section and said driven connection section, said free-wheel comprising at least one lubrication device conveying a lubricating fluid into the connection space.

The free-wheel comprises at least one barrier, the geometry of the barrier varies depending on a speed of rotation of said driving part about the axis of rotation, said barrier being arranged radially between the driving part and the driven part and longitudinally against the connection space, said barrier being constrained to rotate with the driving connecting section.

The driving part thus transmits torque to the driven part during the engaged operating mode via the connecting member or members. Conversely, the driven part is able to rotation independently of the driving part in the disengaged operating mode. The connecting member or members then no longer connect the driving part and the driven part in rotation. In particular, in the disengaged operating mode, the driving part may be rotationally immobile about the axis of rotation, whereas the driven part is, on the contrary, able to rotate about the axis of rotation. During the engaged operating mode, the driven part and the driving part may be able to rotate together about the axis of rotation.

The lubrication device conveys the lubricating fluid into the connection space both during the engaged operating mode and during the disengaged operating mode.

The disclosure therefore proposes a barrier that is extended, during the engaged operating mode and, for example, as from a speed of rotation greater than a threshold, under the effect of a centrifugal force, reaching an extended form in which the barrier represents a barrier with large dimensions against the lubricating fluid present in the connection space. Conversely, the barrier retracts into a retracted form during the disengaged operating mode and, for example, when the speed of rotation is less than or equal to the abovementioned threshold, in order to help discharge the lubricating fluid out of the connection space.

According to one example and, in particular, in the context of a free-wheel set in motion by an engine, this threshold may be established so that the barrier is in an extended form as soon as the engine is operating at an idle speed.

In a rotorcraft provided with a rotor, for example in a helicopter comprising a main rotor, this threshold may be established so that the barrier is in a retracted form when the rotor is in autorotation mode.

The barrier therefore represents a lubrication barrier, with a variable blocking surface area, installed on the inner shaft of the free-wheel, in this case on the driving part.

During the engaged operating mode, the barrier is actually rotated with the driving part. The barrier is deformed under the effect of the centrifugal force. The barrier then becomes active in an extended form that tends to locally and at least partially close the connection space. Lubrication of the connecting members of the free-wheel located in this connection space is thus optimized.

During the disengaged operating mode, the barrier is no longer deformed. The barrier is in a retracted form. The barrier leaves the connection space open and thereby reduces the level of the lubricating fluid in the connection space.

The barrier therefore makes it possible to ensure lubrication substantially by immersing all the elements of the free-wheel present in the connection space during the engaged operating mode, while limiting heating by lowering the level of lubricating fluid in the connection space during the disengaged operating mode.

The free-wheel may comprise one or more of the following additional features, taken individually or in combination.

According to one possibility, said barrier may at least partially close a passage located radially between the driving part and the driven part under the effect of the centrifugal force when the barrier is rotating about the axis of rotation at a speed greater than a threshold, said barrier leaving said passage open in the absence of a said centrifugal force.

The barrier can therefore render the connection space substantially impervious to the lubricating fluid, locally, in one direction and during the engaged operating mode, by extending from the driven part to the driving part. Conversely, during the disengaged operating mode, the barrier retracts and no longer closes a passage.

According to one possibility compatible with the preceding possibility, said barrier may comprise a base that is able to rotate about the axis of rotation with the driving connection section, said barrier comprising a separator that is able to move relative to the base under the effect of the centrifugal force.

The term "separator" denotes a member that is able to extend, between the driving part and the driven part, under the effect of a centrifugal force, or to retract.

The barrier is thus secured to the driving part by its base, the separator being able to be deployed in order to extend the surface area forming a barrier against the lubricating fluid during the engaged operating mode.

The separator may have a shape that is symmetrical with respect to the axis of rotation.

Alternatively, the barrier may extend over an arc of a circle of less than 360 degrees. For example, the base may comprise a ring that extends radially from the driving part to the driven part, this ring having at least one opening that is closed by a separator in the engaged operating mode.

The separator may be hinged to the base. Alternatively, the separator may be connected to the base by a foot formed from an elastically deformable material, for example elastomer. For example, the base may be rigid, for example made from metal, the separator having a flexible deformable membrane secured to a flexible foot fastened to the base.

According to another alternative, the foot may act as a base.

According to one possibility compatible with the preceding possibilities, the barrier may comprise a return member applying a force to the separator.

The return member may apply a force to the separator in the opposite direction to the centrifugal force. The return member may promote the return to the retracted form following the switch from the engaged operating mode to the disengaged operating mode. Such a return member may comprise a spring, for example, or the like.

According to one possibility compatible with the preceding possibilities, the barrier may comprise a material from the polytetrafluoroethylene group.

According to one compatible possibility, the barrier may comprise a material from the elastomer group.

Such a material has the advantage of being flexible and of being able to be elastically deformed under the effect of the centrifugal force.

According to one possibility compatible with the preceding possibilities, said at least one connecting member may comprise a rolling element cooperating with a ramp of the driving part and a cylindrical face of the driven part.

The free-wheel is then, for example, a roller free-wheel comprising several rollers, possibly carried by a cage. However, the free-wheel may be of another type without departing from the context of the disclosure.

According to one possibility compatible with the preceding possibilities, the connection space can extend longitudinally along the axis of rotation from a first side to a second side, said free-wheel comprising a single barrier arranged longitudinally against the first side of the connection space, said free-wheel comprising an opening that brings said second side into fluid communication with an external environment.

Therefore, the connection space is not completely closed, thus allowing the lubricating fluid in the connection space to be replenished.

The dimensions of the opening and the lubrication device may be determined so as to maintain a desired level of lubricating fluid in the connection space during the engaged operating mode.

Alternatively, two barriers may be arranged longitudinally to either side of the connection space.

According to one possibility compatible with the preceding possibilities, said driven part may comprise an annular protuberance arranged opposite the second side, said driving part comprising a closed end arranged in the driven part, said opening being arranged between said protuberance and said closed end.

This characteristic tends to optimize the opening.

According to one possibility compatible with the preceding possibilities, said free-wheel may have at least one bearing interposed in the connection space between the driving part and the driven part.

In this way, a bearing, for example a ball bearing, can also be lubricated.

According to one possibility compatible with the preceding possibilities, the driving connection section may be hollow, said driving connection section comprising at least one channel bringing the connection space into fluid communication with an internal environment arranged in the driving connection section, said lubrication device comprising an injector injecting said lubricating fluid into said internal environment.

The term "injector" is to be interpreted in the broad sense and refers to a member allowing the lubricating fluid to be introduced into the internal environment. For example, the injector may include a jet, a simple pipe, etc.

According to one possibility compatible with the preceding possibilities, said driving connection section may comprise a flange that extends radially into the internal environment from a wall of this driving connection section towards the axis of rotation, without reaching this axis of rotation, said internal environment extending longitudinally along the axis of rotation from said flange to a closed end of the driving part.

The purpose of the flange is to promote the supply of lubricating fluid to the connection space via the passage or passages.

In addition to a free-wheel, the disclosure also relates to a vehicle comprising this free-wheel.

For example, the vehicle may have an engine and a rotor helping the vehicle move, the driving part of the free-wheel being functionally connected to a shaft of the engine and said driven part of the free-wheel being connected to the rotor.

BRIEF DESCRIPTION OF THE DRAWINGS

The disclosure and its advantages appear in greater detail in the context of the following description of embodiments given by way of illustration and with reference to the accompanying figures, in which.

DETAILED DESCRIPTION

Elements that are present in more than one of the figures are given the same references in each of them.

Figure 1:
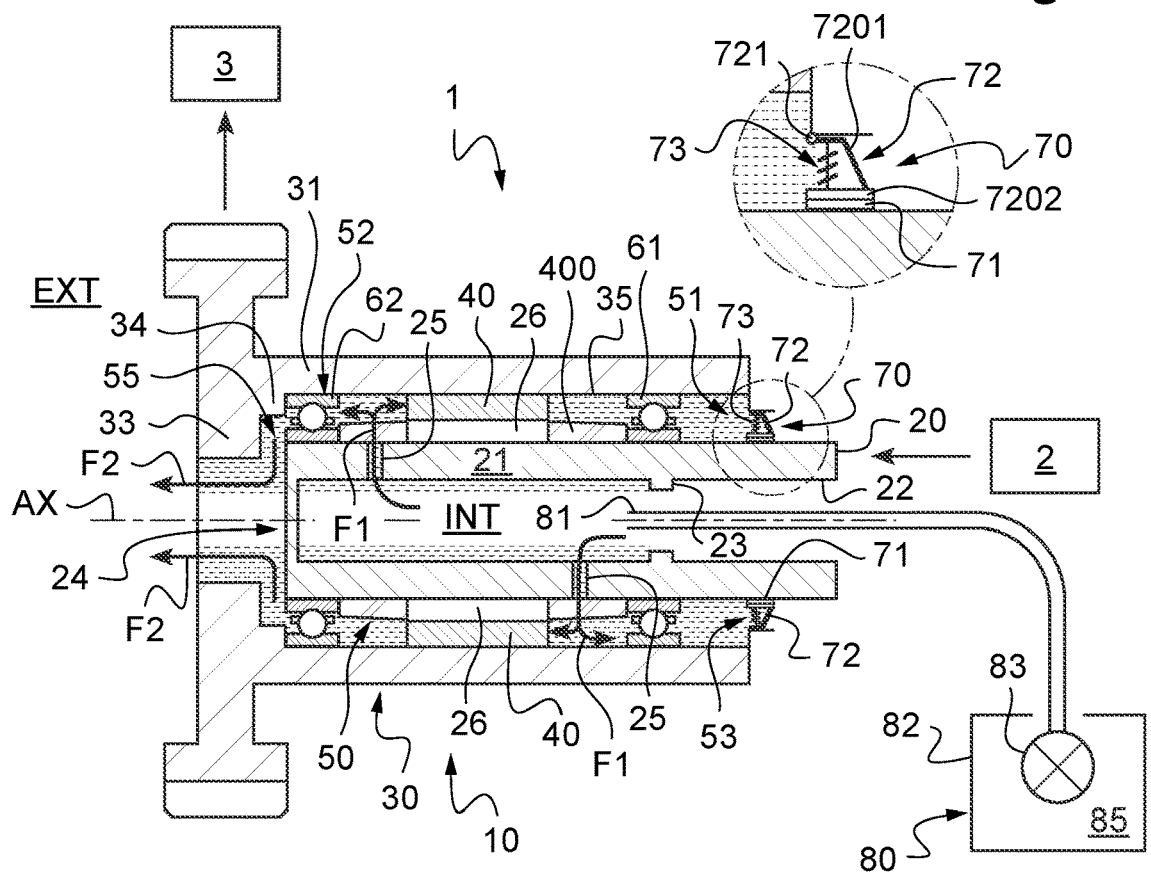
FIG. 1 is a view showing a free-wheel according to the disclosure in the engaged operating mode.

FIG. 1 shows a free-wheel 10 according to the disclosure.

The free-wheel 10 is provided with a driving part 20 and a driven part 30 that are each able to rotate about the same axis of rotation AX. The driving part 20 may be a one-piece component or may comprise several components secured together. The driven part 30 may be a one-piece component or may comprise several components secured together. At least one section of the driving part 20 or the driven part 30 may be symmetrical with respect to the axis of rotation AX.

The driving part 20 may be located radially at least partially between the axis of rotation AX and the driven part 30. The driving part 20 may therefore be surrounded by the driven part 30. In particular, a driven connection section 31 of the driven part 30 at least partially surrounds a driving connection section 21 of the driving part 20.

For example, the driving connection section 21 may be hollow. Optionally, the driving connection section 21 may extend up to an end 24 closed by a bottom, this end 24 being located in the driven part 30.

Irrespective of the relative position of the driving part 20 with respect to the driven part 30, the free-wheel 10 may be arranged within any type of architecture.

For example, the free-wheel 10 may be arranged within a vehicle 1. In particular, the free-wheel 10 may be arranged within a rotorcraft. According to one example, the driving part 20 may be connected by a kinematic linkage to an engine 2, while the driven part 30 may be connected by another kinematic linkage to a rotor 3.

Irrespective of its arrangement, the free-wheel 10 comprises at least one rotational connecting member 40 for connecting the driving part 20 and the driven part 30 in rotation about the axis of rotation AX during an engaged operating mode, and for rotationally disengaging the driving part 20 and the driven part 30 about the axis of rotation AX during a disengaged operating mode.

Irrespective of the number of rotational connecting members 40, each rotational connecting member 40 is arranged in a space referred to for convenience as a "connection space 50" on account of the role played by each rotational connecting member 40. This connection space 50 extends radially, i.e., relative to the axis of rotation AX, and therefore perpendicularly to this axis of rotation AX, between the driving part 20 and the driven part 30. In particular, the connection space 50 is arranged between the driving connection section 21 and the driven connection section 31.

For example, at least one or, if appropriate, each rotational connecting member may be in the form of a rolling element 40, which may be arranged in a cage 400. Such a rolling element 40 may be a cylindrical roller, for example.

Therefore, the driving part 20 may comprise one ramp for each rolling element 40. Each ramp 26 may have an inclined or curved face that is, for example, not tangent to a circle centered on the axis of rotation. Conversely, the driven part 30 may comprise a cylindrical face 35 arranged facing the ramps 26. Each rolling element 40 may then be free to move between a ramp 26 and the cylindrical face 35 during the disengaged operating mode and may be wedged between a ramp 26 and the cylindrical face 35 during the engaged operating mode.

Irrespective of the preceding characteristics, the free-wheel 10 may comprise at least one rotational guide bearing 61, 62, for example between the driving part 20 and the driven part 30. For example, a rotational guide bearing 61, 62 may be in the form of a ball bearing, for example provided with an inner ring and an outer ring.

Each bearing 61, 62 may be positioned in the connection space 50 and may extend radially from the driving part 20 to the driven part 30.

According to the example shown, a first bearing 61 is positioned longitudinally, i.e., along the axis of rotation AX, between a first side 51 of the connection space 50 and the rotational connecting member or members 40.

A second guide bearing 62 is arranged at a second side of the connection space 50. Each rotational connecting member 40 is therefore arranged longitudinally between the first bearing 61 and the second bearing 62.

Other guide systems may be considered. For example, it is possible to arrange two 0-bearings side by side, these two bearings being arranged at the first or second side only.

Irrespective of the preceding features, the free-wheel 10 is provided with a lubrication device 80. This lubrication device 80 includes a lubricating fluid 85. For example, this lubricating fluid 85 comprises oil.

For example, this lubricating fluid 85 may be conveyed by an injector 81 into an internal environment INT delimited by the driving part 20. According to the example shown, the lubrication device 80 may comprise a pump 83 arranged in a tank 82 containing the lubricating fluid 85. The pump 83 conveys the lubricating fluid 85 to the injector 81 via a fluid connection.

Irrespective of this aspect, the injector 81 injects the lubricating fluid into the internal environment INT. For example, the internal environment INT is delimited by the driving connection section 21. For example, the internal environment INT is closed longitudinally in one direction by the end 24.

Optionally, the driving connection section 21 includes a flange 23 partially delimiting the internal environment INT. For example, this flange 23 is in the form of an inner annular protrusion that extends radially into the internal environment INT, from a cylindrical wall 22 of the driving connection section 21 and towards the axis of rotation AX. Due to the centrifugal force exerted during use, such a flange 23 can, together with the end 24, contain the lubricating fluid 85 in the internal environment INT.

In order to transfer the lubricating fluid 85 into the connection space 50, the driving connection section 21 may have at least one channel 25 bringing the internal environment INT and the connection space 50 into fluid communication. Each channel 25 can pass through the wall 22 completely or even radially. Optionally, two channels 25 open longitudinally to either side of the rotational connecting members 40, for example towards the cage 400. If required, the cage 400 may comprise bores capable of being in fluid communication with the channels and the connection space. According to one possibility, at least one channel 25 may pass through a ramp 26 and open onto a rotational connection member 40.

Moreover, the free-wheel 10 comprises at least one barrier 70 arranged radially, in view of the axis of rotation AX, between the driving part 20 and the driven part 30. The barrier 70 is arranged longitudinally at one side of the connection space 50. The geometry of this barrier 70 varies under the effect of the speed of rotation of the driving part 20, and in particular a centrifugal force, in order to close a passage 53 present between the driving part 20 and the driven part 30 during the engaged operating mode.

The barrier 70 is therefore constrained to rotate with the driving connection section 21. The barrier 70 is thus able to rotate about the axis of rotation AX, and is subject to a centrifugal force at least during the engaged operating mode. Conversely, the barrier 70 is stationary when the driving part 20 is also stationary during the disengaged operating mode.

For example, the barrier 70 comprises a base 71 that is fastened to the driving connection section 21. According to one example, the base 71 comprises a band fitted around the driving connection section 21.

Moreover, the barrier 70 comprises a separator 72 that is able to move relative to the base 71 under the effect of said centrifugal force. The separator 72 may be fastened or even hinged to the base 71. According to the example of FIG. 1, the separator 72 may comprise a frustoconical wall 7201 extended by a foot 7202 that is fastened to the base 71. Under the effect of the centrifugal force, the frustoconical wall 7201 tends to be deformed in such a way as to flatten out, like an umbrella being opened, thus tending to close the passage 53. Conversely, in the absence of such a centrifugal force, the frustoconical wall moves closer to the driving part 20, like an umbrella being closed, leaving the passage 53 open.

The separator 72 may optionally comprise an off-center mass element 721 helping the frustoconical wall flatten out under the effect of the centrifugal force.

According to one example, the barrier may be of the umbrella type. The frustoconical wall 7201 may comprise ribs carrying a membrane forming the separator, the ribs being hinged to rods that are themselves hinged to a slider that is able to move in translation on the base.

Figure 2:
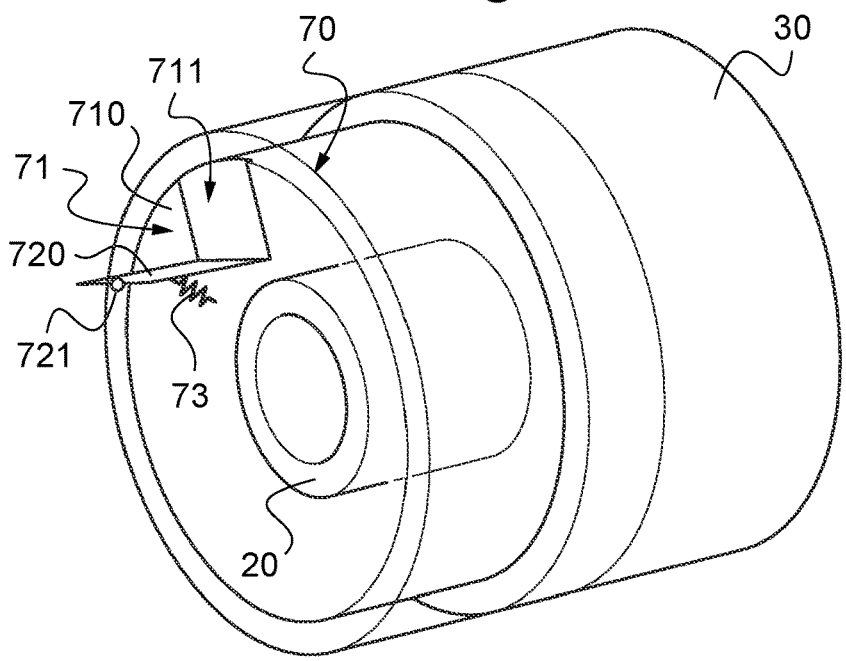
FIG. 2 is a view showing an example of a barrier.

FIG. 2 shows another example of a barrier 70. The base 71 comprises, according to this example, a disk 710 that extends from the driving part 20 to the driven part 30. The disk 710 comprises at least one notch 711 that is suitable for forming a passage 53. The separator 72 comprises a flap 720 capable of closing the notch 711 under the effect of the centrifugal force. For example, the flap 720 includes a mass element 721.

Irrespective of this aspect and with reference once more to FIG. 1, the barrier 70 may comprise a return member 73 acting on the separator 72. In the example shown in FIG. 1, the return member 73 extends between the frustoconical wall 7201 and the foot 7202. The return member 73 could also extend between the separator and the base or indeed between the separator and the driving part.

According to another aspect, the barrier 70 may be made in whole or in part from a material from the polytetrafluoroethylene group or from the elastomer group. According to the example of FIG. 1, the separator may be made from elastomer and the base may be made from a metal or plastic material According to another aspect, the free-wheel 10 may, according to the example shown, comprise only one barrier 70. For example, this single barrier 70 is arranged at the first side 51 of the connection space 50. Consequently, the free-wheel 10 may comprise an opening 55 bringing the second side 52 into fluid communication with an external environment EXT situated outside the free-wheel 10.

For example, the driven part 30 comprises an annular protuberance 33 facing the second side 52. According to the example shown, the protuberance 33 is attached to an internal shoulder 34. This internal shoulder 34 can fasten the second bearing 62 longitudinally in synergy with the cage 400.

The opening 55 can then be in the form of an annular opening arranged longitudinally between the protuberance 33 and the closed end 24 of the driving part 20, or indeed radially facing the internal shoulder 34.

The opening 55 can be positioned in such a way as to help discharge the lubricating fluid through the passage 53 during the disengaged operating mode.

According to a variant not shown here, it is possible to consider, for example, having two barriers 70.

Figure 3:
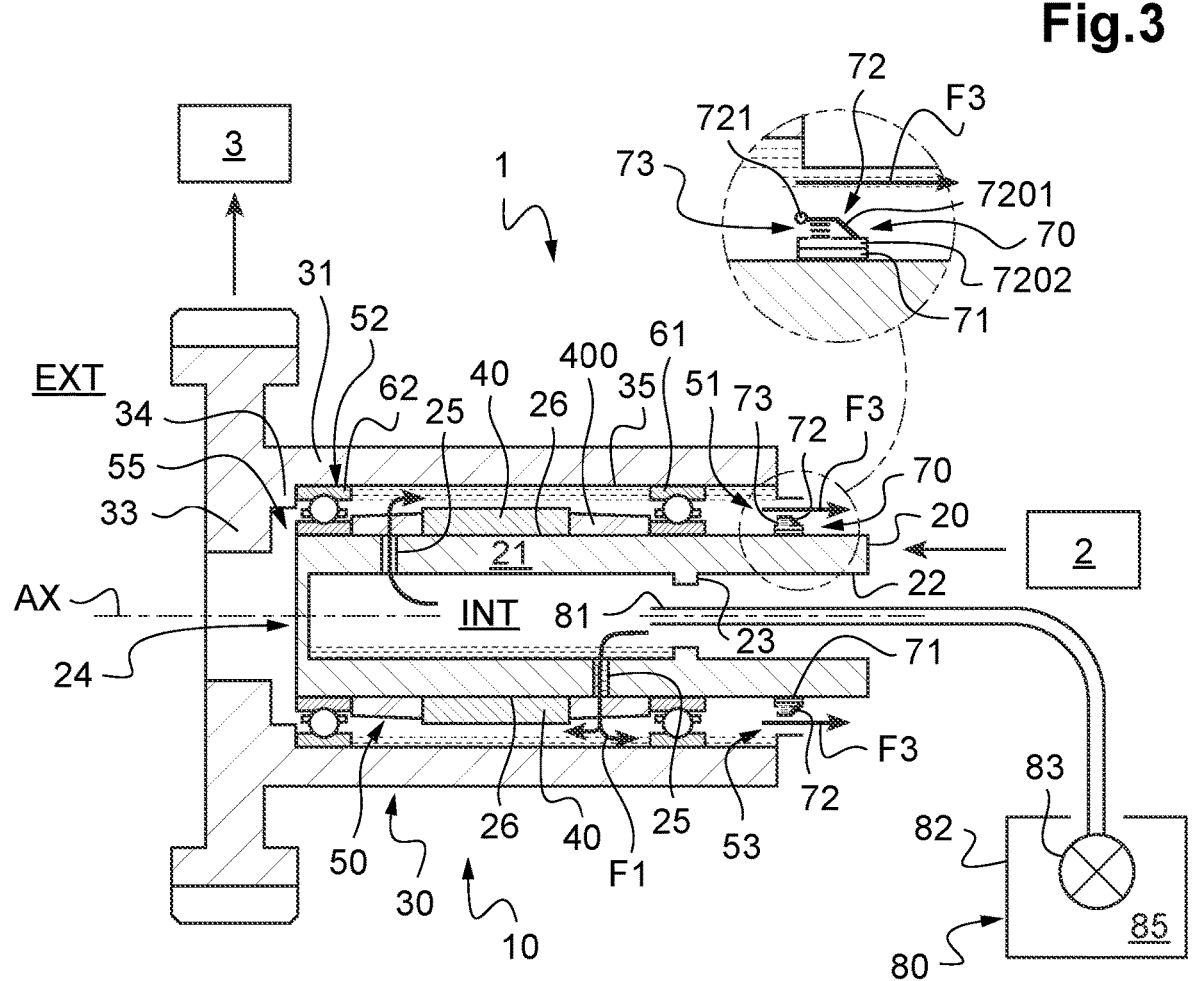
FIG. 3 is a view showing a free-wheel according to the disclosure in the disengaged operating mode.

FIGS. 1 and 3 show the operation of the free-wheel 10.

According to FIG. 1, the free-wheel 10 is in the engaged operating mode.

The barrier 70 shown is therefore set in rotation together with the driving part 20. This barrier 70 is deformed under the effect of the centrifugal force and reaches the extended form shown, in which the barrier 70 closes the passage 53.

The injector 81 conveys the lubricating fluid 85 into the internal environment INT. The lubricating fluid 85 passes through the channels 25 and penetrates into the connection space 50 in the direction shown by the arrow F1.

Since the barrier 70 closes the connection space 50 at the first side 51, the lubricating fluid 85 tends to accumulate in the connection space 50 and to immerse not only the rotational connecting member or members 40 but also any bearings 61, 62. The lubricating fluid 85 gradually overflows out of the connection space 50, in the direction shown by the arrows F2, via the opening 55, and returns, for example, to the tank 82. In order to promote the pool effect, the protuberance 33 of the driven part 30 may extend longitudinally with respect the connection space 50. The size and position of the opening 55 can be determined such that the connection space 50 can be adequately immersed.

During the disengaged operating mode shown in FIG. 3, the driving part 20 can be stationary. The barrier 70 is no longer subjected to the centrifugal force and retracts, for example with the help of the return member 73, if present, to a retracted form. In this retracted position, the barrier 70 no longer closes the passage 53. The connection space 50 may then be partially emptied through this passage 53 in the direction shown by the arrows F3. The rotational connecting member or members 40, as well as any bearings 61, 62, are no longer immersed in the lubricating fluid 85.

In particular, the lubricating fluid 85 may, if required, accumulate against the cylindrical face 35 between the bearings 61, 62 under the effect of the centrifugal force and, according to the example shown, between the outer rings of the bearings 61, 62. If an opening 55 is present, this opening 55 can be positioned so as to be radially further from the cylindrical face 35 than the passage 53 so that the lubricating fluid 85 is discharged through this passage 53. As shown in FIG. 3, the rotational connecting members 40 and also the bearings 61, 62 are then not immersed in the lubricating fluid 85.

Naturally, the present disclosure is subject to numerous variations as regards its implementation. Although several embodiments are described above, it should readily be understood that it is not conceivable to identify exhaustively all the possible embodiments. It is naturally possible to replace any of the means described with equivalent means without going beyond the ambit of the present disclosure.

What is claimed is:

1. A free-wheel comprising a driving part and a driven part that are able to rotate about an axis of rotation, the free-wheel comprising at least one rotational connecting member arranged in a connection space, a driven connection section of the driven part surrounding a driving connection section of the driving part, the connection space being located radially, with respect to the axis of rotation, between the driving connection section and the driven connection section, the free-wheel having at least one lubrication device conveying a lubricating fluid into the connection space,
wherein the free-wheel comprises at least one barrier, a geometry of the barrier varies depending on a speed of rotation of the driving part about the axis of rotation, the barrier being arranged radially between the driving part and the driven part and longitudinally against the connection space, the barrier being constrained to rotate with the driving connection section.

2. The free-wheel according to claim 1
wherein the barrier at least partially closes a passage located radially between the driving part and the driven part under the effect of the centrifugal force when the barrier is rotating about the axis of rotation at a speed greater than a threshold, the barrier leaving the passage open in the absence of the centrifugal force.

3. The free-wheel according to claim 1
wherein the barrier comprises a base that is able to rotate about the axis of rotation with the driving connection section, the barrier comprising a separator that is able to move relative to the base under the effect of the centrifugal force.

4. The free-wheel according to claim 3
wherein the barrier has a return member applying a force to the separator.

5. The free-wheel according to claim 1
wherein the barrier comprises a material from the polytetrafluoroethylene group.

6. The free-wheel according to claim 1
wherein the barrier comprises a material from the elastomer group.

7. The free-wheel according to claim 1
wherein the at least one connecting member comprises a rolling element cooperating with a ramp of the driving part and a cylindrical face of the driven part.

8. The free-wheel according to claim 1
wherein the connection space extends longitudinally along the axis of rotation from a first side to a second side, the free-wheel comprising a single barrier arranged longitudinally against the first side of the connection space, the free-wheel comprising an opening that brings the second side into fluid communication with an external environment.

9. The free-wheel according to claim 8
wherein the driven part comprises an annular protuberance arranged opposite the second side and the driving part comprises a closed end arranged in the driven part, the opening being arranged between the protuberance and the closed end.

10. The free-wheel according to claim 1
wherein the free-wheel comprises at least one bearing interposed in the connection space between the driving part and the driven part.

11. The free-wheel according to claim 1
wherein the driving connection section is hollow, the driving connection section comprising at least one channel bringing the connection space into fluid communication with an internal environment arranged in the driving connection section, the lubrication device comprising an injector injecting the lubricating fluid into the internal environment.

12. The free-wheel according to claim 11
wherein the driving connection section comprises a flange that extends radially into the internal environment from a wall of the driving connection section towards the axis of rotation, without reaching the axis of rotation, the internal environment extending longitudinally along the axis of rotation from the flange to a closed end of the driving part.

13. A vehicle
wherein the vehicle comprises the free-wheel according to claim 1.

14. The vehicle according to claim 13
wherein the vehicle comprises an engine and a rotor helping the vehicle move, the driving part being functionally connected to a shaft of the engine and the driven part being connected to the rotor.

\* \* \* \* \*